(12) United States Patent
Wu et al.

(10) Patent No.: US 10,880,490 B2
(45) Date of Patent: Dec. 29, 2020

(54) IMAGING METHOD, IMAGING DEVICE, REARVIEW MIRROR AND STORAGE MEDIUM

(71) Applicant: BOE Technology Group Co., Ltd., Beijing (CN)

(72) Inventors: Ying Wu, Beijing (CN); Minbiao Zhou, Beijing (CN); Xiao Chu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 8 days.

(21) Appl. No.: 16/245,364

(22) Filed: Jan. 11, 2019

(65) Prior Publication Data
US 2019/0313002 A1 Oct. 10, 2019

(30) Foreign Application Priority Data
Apr. 9, 2018 (CN) .......................... 2018 1 0312253

(51) Int. Cl.
*H04N 5/235* (2006.01)
*B60R 1/08* (2006.01)

(52) U.S. Cl.
CPC ........... *H04N 5/2351* (2013.01); *B60R 1/083* (2013.01); *H04N 5/2352* (2013.01)

(58) Field of Classification Search
CPC ............. H04N 5/23218; H04N 5/2351; H04N 5/2352; B60R 1/083; G01J 1/42; G01J 1/4204; G01J 1/4209
See application file for complete search history.

(56) References Cited

U.S. PATENT DOCUMENTS

| 5,210,566 A * | 5/1993 | Nishida ................ H04N 5/2351 396/123 |
| 7,663,476 B2 * | 2/2010 | Watanabe .............. B60Q 9/005 340/435 |
| 7,916,209 B2 * | 3/2011 | Asoma ................. H04N 5/2355 348/362 |

(Continued)

FOREIGN PATENT DOCUMENTS

| CN | 1669313 A | 9/2005 |
| CN | 101800859 A | 8/2010 |

(Continued)

OTHER PUBLICATIONS

First office action of Chinese application No. 201810312253.0 dated Nov. 21, 2019.

*Primary Examiner* — Chiawei Chen
(74) *Attorney, Agent, or Firm* — Fay Sharpe LLP

(57) ABSTRACT

Provided are an imaging method, an imaging device, a rearview mirror and a storage medium. The imaging method includes: performing spot photometry on a first photometric area of a plurality of photometric areas divided from an image to be tested; and acquiring, according to a result of spot photometry on the first photometric area, a first target image corresponding to the image to be tested. By selecting an appropriate first photometric area to perform the spot photometry and then acquiring the first target image according to the result of spot photometry, the imaging of a target object contained in the first target image would be clearer since the photometric result of a spot photometry is more accurate and is not affected by other areas.

17 Claims, 5 Drawing Sheets

(56) References Cited

U.S. PATENT DOCUMENTS

| | | | |
|---|---|---|---|
| 9,704,250 B1* | 7/2017 | Shah | G06T 7/0065 |
| 2004/0190890 A1* | 9/2004 | Osawa | G03B 7/08 |
| | | | 396/234 |
| 2005/0254691 A1 | 11/2005 | Nakami | |
| 2007/0036531 A1 | 2/2007 | Tokunaga | |
| 2007/0160357 A1* | 7/2007 | Lin | G03B 7/097 |
| | | | 396/65 |
| 2007/0160359 A1* | 7/2007 | Imamura | G02B 7/102 |
| | | | 396/238 |
| 2007/0263090 A1* | 11/2007 | Abe | B60R 1/00 |
| | | | 348/148 |
| 2008/0062275 A1* | 3/2008 | Miyazaki | G03B 7/28 |
| | | | 348/229.1 |
| 2008/0309788 A1* | 12/2008 | Onozawa | H04N 5/232 |
| | | | 348/222.1 |
| 2009/0245775 A1* | 10/2009 | Osawa | G03B 15/02 |
| | | | 396/61 |
| 2010/0020220 A1* | 1/2010 | Sugita | H04N 5/23219 |
| | | | 348/333.01 |
| 2010/0201842 A1* | 8/2010 | Jung | H04N 5/23293 |
| | | | 348/229.1 |
| 2010/0245622 A1* | 9/2010 | Muramatsu | H04N 5/23219 |
| | | | 348/229.1 |
| 2011/0128435 A1* | 6/2011 | Ikeda | H04N 5/2351 |
| | | | 348/362 |
| 2014/0063288 A1* | 3/2014 | Suh | G01J 1/0414 |
| | | | 348/229.1 |
| 2015/0022659 A1* | 1/2015 | Yamada | G01J 1/0266 |
| | | | 348/136 |

FOREIGN PATENT DOCUMENTS

| | | | |
|---|---|---|---|
| CN | 104954687 A | | 9/2015 |
| JP | 2000250090 A | | 9/2000 |
| JP | 2001272710 A | * | 10/2001 |
| JP | 2006119454 A | | 5/2006 |

* cited by examiner

| N4 | N8 | N12 | N16 |
|---|---|---|---|
| N3 | N7 | N11 | N15 |
| N2 | N6 | N10 | N14 |
| N1 | N5 | N9 | N13 |

FIG. 2

IMAGING METHOD, IMAGING DEVICE, REARVIEW MIRROR AND STORAGE MEDIUM

CROSS-REFERENCE TO RELATED APPLICATION

The present application claims the priority of Chinese Patent Application No. 201810312253.0, filed on Apr. 9, 2018 and entitled "IMAGING METHOD, IMAGING DEVICE AND REARVIEW MIRROR", which is incorporated herein by reference in its entirety.

TECHNICAL FIELD

The present disclosure relates to the field of imaging technology, and in particular to an imaging method, an imaging device, a rearview mirror and a storage medium.

BACKGROUND

When a car is travelling normally, the rearview mirror camera will transmit an acquired image to a display device such as the central rearview mirror after acquiring the image of a rearward vehicle, and the image would be displayed on the imaging interface of the central rearview mirror. However, when a car is travelling at night, the brightness of the lights emitted by the rearward vehicle is usually relatively high, which would cause the imaged picture of a target object (i.e., the rearward vehicle) to be too bright. Further, this may result in unclear imaging of the target object, which would affect the driving judgment of a driver.

SUMMARY

The present disclosure provides an imaging method, an imaging device, a rearview mirror, and a storage medium.

In a first aspect, there is provided an imaging method, comprising:

performing spot photometry on a first photometric area of a plurality of photometric areas divided from an image to be tested, wherein the first photometric area is any one of the plurality of photometric areas; and acquiring, according to a result of spot photometry on the first photometric area, a first target image corresponding to the image to be tested.

In some embodiments, said acquiring, according to a result of spot photometry on the first photometric area, a first target image corresponding to the image to be tested comprises:

determining an exposure value according to the result of spot photometry on the first photometric area; and acquiring, based on the exposure value, the first target image corresponding to the image to be tested.

In some embodiments, the method further comprises:

outputting the first target image when a target object is detected in the first target image.

In some embodiments, the method further comprises:

when the target object is not detected in the first target image, replacing the first photometric area of the plurality of photometric areas, performing spot photometry on the replaced first photometric area, and acquiring, according to the result of spot photometry, the first target image.

In some embodiments, the method further comprises:

when the target object is not detected in the first target images corresponding to the plurality of photometric areas, performing average photometry on the area with the highest brightness in the plurality of photometric areas;

acquiring, according to a result of average photometry on the area with the highest brightness, a second target image to be processed;

adjusting the brightness value of the second target image to be processed to obtain the second target image; and outputting the second target image when the target object is detected in the second target image.

In some embodiments, the method further comprises:

when the target object is not detected in the second target image, selecting a designated photometric area from the plurality of photometric areas, and performing average photometry on the designated photometric area; and acquiring and outputting a third target image according to a result of average photometry on the designated photometric area.

In some embodiments, prior to said performing spot photometry on a first photometric area of a plurality of photometric areas divided from an image to be tested, the method further comprises:

judging whether the difference value between brightness values of any two imaging areas in the image to be tested is greater than a set threshold; and when the difference value between brightness values of any two imaging areas is greater than the set threshold, switching a photometric mode to a spot photometric mode.

In some embodiments, the result of spot photometry on the first photometric area comprises the brightness of light reflected by an object being shot in the first photometric area.

In some embodiments, said acquiring, based on the exposure value, the first target image corresponding to the image to be tested comprises:

determining an aperture value and a shutter speed based on the exposure value; and acquiring, based on the aperture value and the shutter speed, a first target image corresponding to the image to be tested.

In a second aspect, there is provided an imaging device, comprising:

one or more processors; and a memory;

wherein the memory stores one or more programs configured to be executed by the one or more processors, and the one or more programs comprise instructions for performing the following operations of:

performing spot photometry on a first photometric area of a plurality of photometric areas divided from an image to be tested, wherein the first photometric area is any one of the plurality of photometric areas; and acquiring, according to a result of spot photometry on the first photometric area, a first target image corresponding to the image to be tested.

In some embodiments, the one or more programs comprise instructions for performing the following operations of:

determining an exposure value according to the result of spot photometry on the first photometric area; and acquiring, based on the exposure value, the first target image corresponding to the image to be tested.

In some embodiments, the one or more programs further comprise instructions for performing the following operations of:

outputting the first target image when a target object is detected in the first target image.

In some embodiments, the one or more programs further comprise instructions for performing the following operations of:

when the target object is not detected in the first target image, replacing the first photometric area of the plurality of photometric areas, performing spot photometry on the replaced first photometric area, and acquiring, according to the result of spot photometry, the first target image.

In some embodiments, the one or more programs further comprise instructions for performing the following operations of:

when the target object is not detected in the first target images corresponding to the plurality of photometric areas, performing average photometry on the area with the highest brightness in the plurality of photometric areas;

acquiring, according to a result of average photometry on the area with the highest brightness, a second target image to be processed;

adjusting the brightness value of the second target image to be processed to obtain the second target image; and outputting the second target image when the target object is detected in the second target image.

In some embodiments, the one or more programs further comprise instructions for performing the following operations of:

when the target object is not detected in the second target image, selecting a designated photometric area from the plurality of photometric areas, and performing average photometry on the designated photometric area; and acquiring and outputting a third target image according to a result of average photometry on the designated photometric area.

In some embodiments, the one or more programs further comprise instructions for performing the following operations of:

judging whether the difference value between brightness values of any two imaging areas in the image to be tested is greater than a set threshold; and when the difference value between brightness values of any two imaging areas is greater than the set threshold, switching a photometric mode to a spot photometric mode.

In some embodiments, the result of spot photometry on the first photometric area comprises the brightness of light reflected by an object being shot in the first photometric area.

In some embodiments, the one or more programs comprise instructions for performing the following operations of:

determining an aperture value and a shutter speed based on the exposure value; and acquiring, based on the aperture value and the shutter speed, a first target image corresponding to the image to be tested.

In a third aspect, there is provided a rearview mirror comprising an imaging device, wherein the imaging device comprises:
one or more processors; and
a memory;

wherein the memory stores one or more programs configured to be executed by the one or more processors, and the one or more programs comprise instructions for performing the following operations of:

performing spot photometry on a first photometric area of a plurality of photometric areas divided from an image to be tested, wherein the first photometric area is any one of the plurality of photometric areas; and acquiring, according to a result of spot photometry on the first photometric area, a first target image corresponding to the image to be tested In a fourth aspect, there is provided a computer-readable storage medium having stored therein instructions that, when executed by a processing component of a computer, cause the processing component to perform the imaging method in the first aspect.

BRIEF DESCRIPTION OF THE DRAWINGS

FIG. 2 shows a schematic diagram of photometric areas according to an embodiment of the present disclosure;

DETAILED DESCRIPTION

The embodiments of the present disclosure will be further described in detail by combining the accompanying drawings, to present the principles and advantages of the present disclosure more clearly.

In the field of security and protection, there are two manners to process a picture which is not clearly imaged. In the first manner, the imaging picture is divided into several areas and each area is exposed separately. Since the average detected signal level of the area corresponding to a target object is relatively low, by adjusting the working point of an AGC (Automatic Gain Control) circuit, the amplitude value of the output signal of the area corresponding to the target object could be increased. In the second manner, exposure is performed twice at a time, one has shorter exposure time and the other has longer exposure time, and then the two exposures are synthesized.

However, a defect of the first manner lies in that the contrast between the target object and the background area is reduced and the processed image has lowered contrast degree. This is because that the brightness of the target object is improved by increasing the amplitude value of the output signal of the area corresponding to the target object, but the brightness of the background area remains unchanged. A defect of the second manner lies in that the double exposure causes waste of resources and the efficiency of image synthesis is low.

Figure 1:
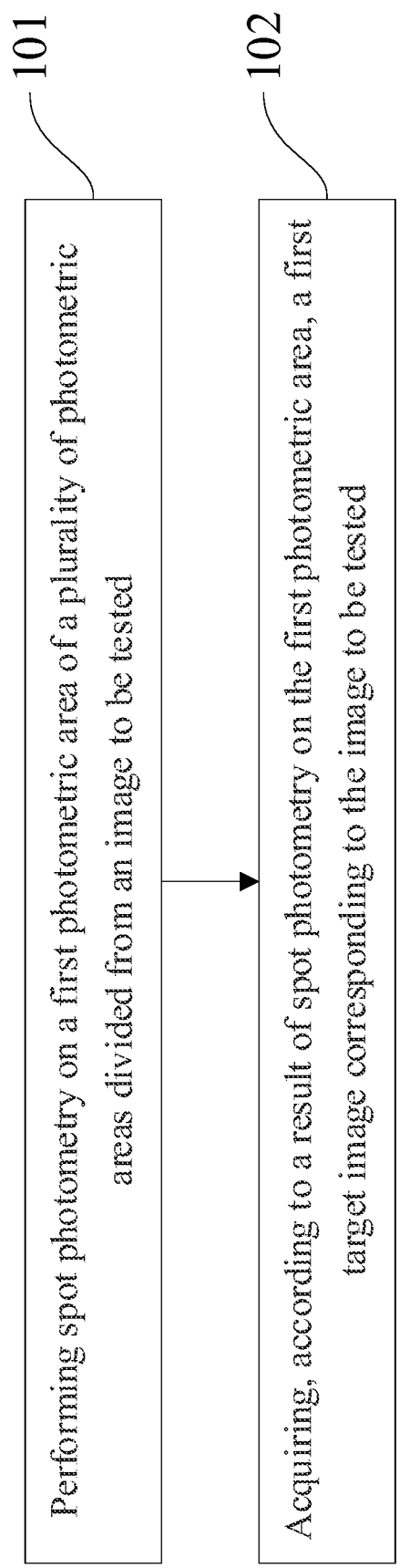
FIG. 1 shows a flow chart of an imaging method according to an embodiment of the present disclosure.

Referring to FIG. 1, a flowchart of an imaging method according to an embodiment of the present disclosure is shown. The imaging method may comprise the following steps.

In step 101, in the plurality of photometric areas divided from an image to be tested, spot photometry is performed on a first photometric area of the plurality of photometric areas.

In an embodiment of the present disclosure, the image to be tested is divided into a plurality of photometric areas. In the plurality of photometric areas as divided, a first photometric area is subjected to spot photometry, in which mainly the brightness of light reflected by an object being shot in the first photometric area is measured.

The first photometric area refers to any one of the plurality of photometric areas, and the object being shot refers to any object in the first photometric area, and may be a target object or an object in the background area. The target object refers to an object required to be clearly imaged in the image to be tested.

Referring to FIG. 2, a schematic diagram of photometric areas in an embodiment of the present disclosure is shown.

The image to be tested may be divided into 16 photometric areas, such as N1, N2, N3 to N16. Certain one of the 16 photometric areas is the first photometric area. The brightness of the light reflected by an object in a certain photometric area of the 16 photometric areas is measured.

For example, if the first photometric area is N10, the brightness of the light reflected by the object in the first photometric area N10 is measured.

A camera could be employed to conduct spot photometry on the first photometric area. The spot photometry refers to perform an independent photometry on one part of the picture (that is, the first photometric area), while omitting other parts of the picture.

In some embodiments of the present disclosure, the camera has a plurality of photometric modes, such as spot photometric mode, average photometric mode, center-weighted photometric mode and the like. It is free to switch from one photometric mode to another. The average photometry means that the picture is divided into a plurality of areas, each area is subjected to an independent photometry, and then an average photometric value of the entire picture is calculated based on the independent photometric results of the individual areas. The center-weighted photometry means that the picture is divided into a plurality of areas, each area is subjected to an independent photometry, and then the individual areas are subjected to a weighted calculation, in which the weight of the central parts of the picture is much greater than the weight of the edge parts of the picture, and the photometric value is determined according to the weighted calculation result.

In an embodiment of the present disclosure, the image to be tested may be divided into N photometric areas. A first photometric area of the N photometric areas is subjected to spot photometry. The first photometric area may be any one of the N photometric areas, and N is a positive integer greater than one.

In step 102, a first target image corresponding to the image to be tested is acquired according to the result of spot photometry on the first photometric area.

In one embodiment of the present disclosure, after a spot photometry is performed on the first photometric area, the first target image corresponding to the image to be tested is acquired according to the result of spot photometry on the first photometric area.

It should be noted that the first target image is a complete picture including a plurality of photometric areas, and is not merely the picture corresponding to the first photometric area.

For example, the first photometric area is N10, and the result of spot photometry on the first photometric area N10 is A1. That is, the brightness of the light reflected back by the object being shot in the first photometric area N10 is A1. Based on the brightness A1, the corresponding parameters of the camera may be adjusted. According to the adjusted parameters, the camera acquires the first target image including the 16 photometric areas corresponding to the image to be tested.

When the brightness of the target object in the image to be tested is too low and the brightness of the background area is too high, or otherwise when the brightness of the target object in the image to be tested is too high and the brightness of the background area is too low, if spot photometric mode is adopted, the spot photometry is only performed on the first photometric area of the image to be tested and the photometric results of areas other than the first photometric area in the image to be tested would not affect the result of spot photometry on the first photometric area. As such, the parameters of the camera would be adjusted according to the result of spot photometry on the first photometric area. Thus, in the image (i.e., the first target image) acquired by the camera with the adjusted parameters, the relative brightness of the first photometric area to other areas would not be changed, and the contrast of the image acquired by the camera would not be reduced. The spot photometric mode is especially suitable for the conditions where the light and dark contrast is strong and the target object needs to be properly exposed without being interfered by other light.

If average photometric mode is adopted for photometry, the average detected photometric value is greater than the photometric result of the target object, but lower than the photometric result of the background area. As such, in the image (i.e., the first target image) exposed according to the average photometric value, it would be likely that the target object is overexposed while the background area is underexposed.

If center-weighted average photometric mode is adopted for photometry, if the target object is not in the center of the picture of the image to be tested, then the calculated photometric result is greater than the photometric result of the target object and is lower than the photometric result of the background area. In the obtained image (i.e., the first target image), it is also like that the target object is overexposed and the background area is underexposed. Assuming that the target object is in the center of the picture of the image to be tested, yet the photometric result of the edge area of the picture would still affect the final weighted calculation result, which results in that the calculated photometric result would still be greater than the photometric result of the target object.

Exemplarily, the first target image may be a forward or rearward picture of a car collected by the camera when the car is travelling at night. In the case of a rearward picture, supposing that there are two vehicles behind the car, a rearward vehicle 1 is closer to the car and a rearward vehicle 2 is farther away from the car, when the brightness of the lights of the rearward vehicle 2 is very high and the brightness of the lights of the rearward vehicle 1 is very low, then the brightness of the target object (i.e., the rearward vehicle 1) is low and the brightness of the background area is high. In another case of a forward picture, since the brightness of the lights of the vehicle travelling in an opposite direction is very high, the brightness of the target object (the vehicle travelling in the opposite direction) is high, and the brightness of the background area is low.

In both cases, there would be a problem of unclear imaging of the vehicle in the image to be tested, which will affect the driving judgment of a driver. By switching the photometric mode of the camera to the spot photometric mode, dividing the image to be tested into a plurality of photometric areas, performing spot photometry to a first photometric area is subjected, and acquiring the first target image according to the result of spot photometry, a better imaging picture of the forward or rearward vehicles can be acquired when the car is travelling at night.

It should be noted that no matter which photometric mode is adopted for photometry and the subsequent acquisition of the first target image, the target object would be contained in the first target image. However, with regard to the average photometric mode and the center-weighted photometric mode, since the photometric results thereof have some deviation, the imaging of the target object contained in the first target image would be unclear. In contrast, when the spot photometric mode is adopted, since the photometric result of the spot photometry is more accurate and is not affected by other areas, the imaging of the target object contained in the first target image is clearer.

In summary, according to the imaging method provided in an embodiment of the present disclosure, the spot photometry is performed on a first photometric area of the plurality of photometric areas divided from the image to be tested. According to the result of spot photometry on the first photometric area, a first target image corresponding to the image to be tested is acquired. By selecting an appropriate first photometric area to perform the spot photometry and then acquiring the first target image according to the result of spot photometry, the imaging of a target object contained in the first target image would be clearer since the photometric result of a spot photometry is more accurate and is not affected by other areas. Brightness adjustment is not performed on any area after the first target image is acquired, so that the contrast of the first target image would not be lowered.

Figure 3:
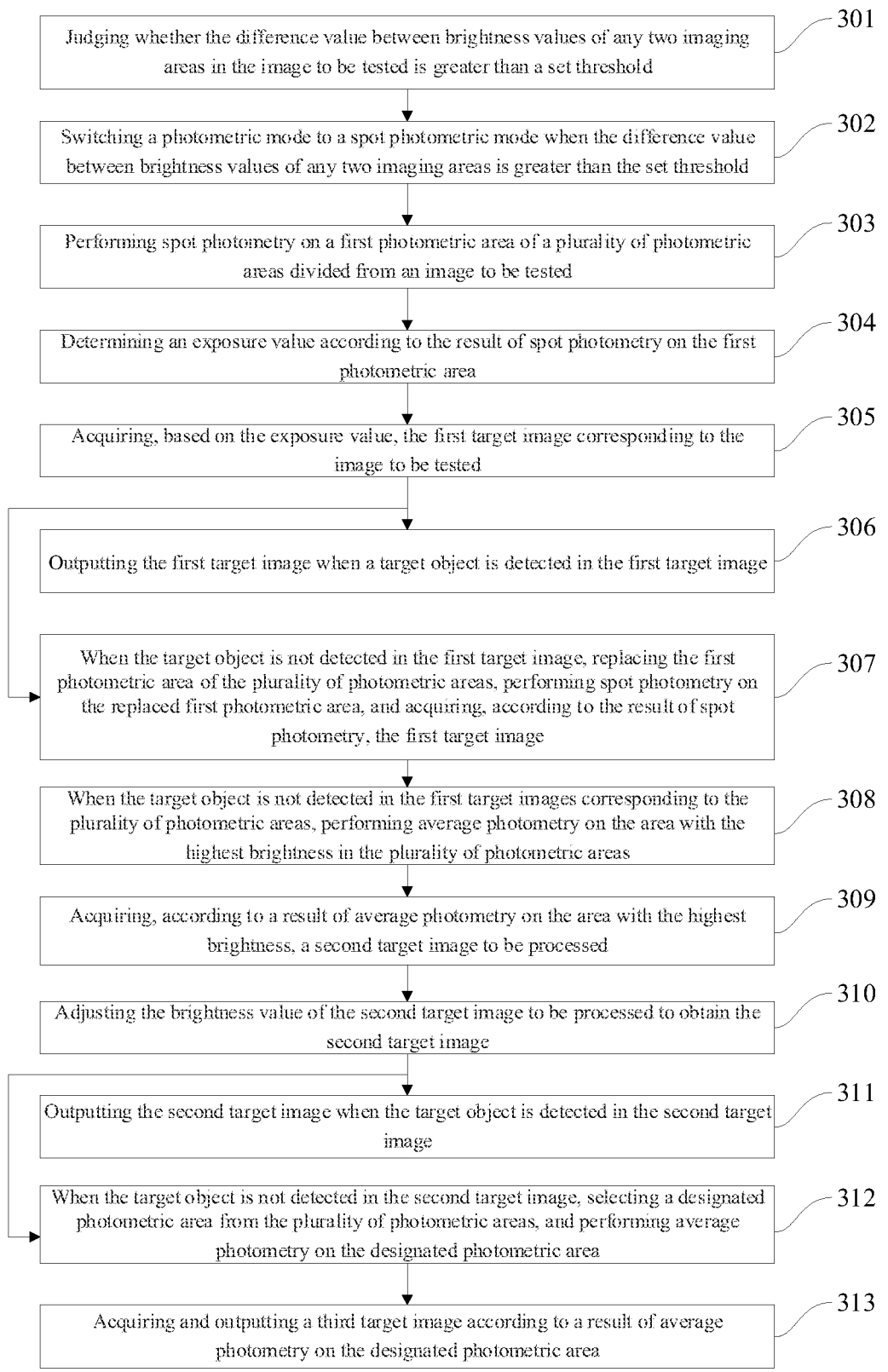
FIG. 3 shows a flow chart of another imaging method according to an embodiment of the present disclosure.

Referring to FIG. 3, in which a flowchart of another imaging method according to an embodiment of the present disclosure is shown and may specifically comprise the following steps.

In step 301, whether the difference value of the brightness values of any two imaging areas in the image to be tested is greater than a set threshold is judged.

In an embodiment of the present disclosure, the camera may detect the brightness value of each of the plurality of imaging areas in the image to be tested, and whether the difference value of the brightness values of any two imaging areas in the image to be tested is greater than a set threshold is judged. It should be noted that the imaging area refers to any area in the image to be tested, and may overlap with the range of the photometric area as subsequently divided, or may not overlap with the range of the photometric area as subsequently divided.

For example, when the camera detects that in the image to be tested, the brightness value of an imaging area B1 is M1, and the brightness value of an imaging area B2 is M2, then whether the difference value M1-M2 between the brightness values of the imaging area B1 and the imaging area B2 is greater than the set threshold M is judged.

In step 302, when the difference value of the brightness values of any two imaging areas is greater than the preset threshold, the photometric mode is switched to the spot photometric mode.

In an embodiment of the present disclosure, if the difference value of the brightness values of any two imaging areas in the image to be tested is greater than the set threshold, the photometric mode of the camera is switched to the spot photometric mode.

For example, in the case that a car is travelling at night, and the camera acquires the picture behind the car, when the brightness of the lights of the rearward vehicle is very high and the rearward vehicle is covered by the strong light, the brightness of the target object is high while the brightness of the background area is low. Otherwise, when there are two vehicles behind the car, a rearward vehicle 1 is closer to the car and a rearward vehicle 2 is farther away from the car, when the brightness of the lights of the rearward vehicle 2 is very high while the brightness of the lights of the rearward vehicle 1 is very low, then the brightness of the target object (i.e., the rearward vehicle 1) is low and the brightness of the background area is high. In both cases, the driving judgment of the driver would be affected. When the camera detects that the difference value between the brightness values of any two imaging areas (for example, the imaging area where the target object is located and the imaging area where the background area is located) in the image to be tested is greater than the set threshold, it can be judged that the camera is exposed to the strong light of a rearward vehicle during travelling at night, and the photometric mode of the camera is automatically switched to the spot photometric mode.

For example, when the difference value M1-M2 of the brightness values between the imaging area B1 and the imaging area B2 is greater than the set threshold M, the photometric mode of the camera is switched to the spot photometric mode.

In step 303, in the plurality of photometric areas divided from the image to be tested, a first photometric area of the plurality of photometric areas is subjected to spot photometry.

The step is similar to the above step 101 in principle, and is not repeated in detail here.

In step 304, an exposure value is determined according to the result of spot photometry on the first photometric area.

In an embodiment of the present disclosure, the exposure value of the camera is determined according to the result of spot photometry on the first photometric area of the plurality of photometric areas, that is, according to the detected light brightness in the event that the result is the brightness of the light reflected by the object being shot in the first photometric area.

In step 305, a first target image corresponding to the image to be tested is acquired based on the exposure value.

In an embodiment of the present disclosure, the aperture value and the shutter speed of the camera are determined according to the exposure value of the camera. The first target image corresponding to the image to be tested is acquired based on the aperture value and the shutter speed of the camera.

In step 306, when the target object is detected in the first target image, the first target image is output.

In an embodiment of the present disclosure, the first target image is detected, and when the target image is detected in the first target image, the first target image is output.

The first target image may be output to a corresponding display setting, and the user may directly observe the acquired first target image in a display device.

For example, the first target image may be a forward or rearward picture of a car travelling at night collected by a camera, and the target object is a vehicle in front of or behind the car. If a vehicle is successfully detected in the first target image, it is indicated that the vehicle is clearly imaged, and the first target image can be output.

The detection method for detecting the first target image may be implemented by feature matching. For example, when the target object is a vehicle, the feature parameters of each part of the vehicle are preset. When the first target image is acquired, all the objects in the first target image are matched with the preset feature parameters, and if the matching is successful, it means that a vehicle is detected.

In step 307, when the target object is not detected in a first target image, the first photometric area of the plurality of photometric areas is replaced. The replaced first photometric area is subjected to spot photometry, and according to the result of spot photometry, the first target image is acquired.

In an embodiment of the present disclosure, when the target object is not detected in the first target image, in the divided plurality of photometric areas, the first photometric area is replaced, and steps 303, 304, 305 and 306 are repeatedly performed. The spot photometry is performed on the replaced first photometric area, and the first target image is acquired according to the result of spot photometry.

For example, as shown in FIG. 2, in the 16 photometric areas, the first photometric area selected for the first time is the photometric area N10. The photometric area N10 is subjected to spot photometry, and the first target image P10 is acquired according to the result of spot photometry. When the target image is not detected in the first target image P10, a next photometric area is selected. The first photometric area selected for the second time is the photometric area N11. The photometric area N11 is subjected to spot photometry, and the first target image P11 is acquired according to the result of spot photometry. When the target object is detected in the first target image P11, the first target image P11 is output. When the target image is not detected in the first target image P11, a next photometric area is selected. The first photometric area selected for the third time is the photometric area N12. The photometric area N12 is subjected to spot photometry, and the first target image P12 is acquired according to the result of spot photometry. When the target object is detected in the first target image P12, the first target image P12 is output. When the target object is not detected in the first target image P12, a next photometric area is continuously selected, and the above steps are repeated.

In step 308, when the target object is not detected in the first target images corresponding to the plurality of photometric areas as divided, the area with the highest brightness in the plurality of photometric areas is subjected to average photometry.

In an embodiment of the present disclosure, when the target object is not detected in the first target images corresponding to the plurality of photometric areas as divided, the photometric mode of the camera is automatically switched from the spot photometric mode to the average photometric mode. The area with the highest brightness in the plurality of photometric areas is subjected to average photometry.

For example, in the case that a car is travelling at night, when there is no rearward vehicle detected in the first target images corresponding to the N photometric areas, it is indicated that the brightness of the lights emitted by the rearward vehicle is too high, and the rearward vehicle is covered by strong light. Thus, the photometric mode of the camera is switched to the average photometric mode, and the area with the highest brightness in the N photometric areas is subjected to average photometry.

The area with the highest brightness may be one of the N photometric areas, for example, N10 in FIG. 2. For instance, each of the photometric areas may be subjected to spot photometry separately, and according to the detected brightness of the light of each of the photometric areas, the photometric area N10 is selected as the area with the highest brightness.

The area with the highest brightness may also be a plurality of photometric areas in the N photometric areas. As shown in FIG. 2, the right half part of the photometric area N10 and the left half of the photometric area N11 form the area with the highest brightness together.

In step 309, a second target image to be processed is acquired according to the result of average photometry on the area with the highest brightness.

In an embodiment of the present disclosure, the exposure value of the camera is determined according to the result of average photometry on the area with the highest brightness. The aperture value and the shutter speed of the camera are adjusted according to the determined exposure value, and a second target image to be processed is acquired.

In step 310, the brightness value of the second target image to be processed is adjusted to obtain a second target image.

In an embodiment of the present disclosure, the result of average photometry on the area with the highest brightness is relatively high, so that the brightness value of the acquired second target image to be processed is relatively high. Therefore, the brightness value of the second target image to be processed needs to be adjusted to obtain a second target image. When the brightness value of the second target image is adjusted, the brightness value of the target object contained in the second target image is also adjusted accordingly, so that the imaging of the target object contained in the second target image is clearer.

Exemplarily, the second target image to be processed may be input to an AGC circuit, the video (i.e., the second target image to be processed) signal level is detected by the AGC circuit, and the working point of the AGC circuit is adjusted by the level of the video signal. The amplitude value of the video signal is reduced, that is, the brightness value of the second target image to be processed is reduced, to obtain the second target image.

It should be noted that in this step, the brightness value of the second target image to be processed is reduced by the AGC circuit, so that the brightness values of the target object and the background area are simultaneously reduced, and the reduced amplitudes of the brightness values are consistent. Therefore, the contrast of the second target image obtained after processing is not reduced either.

In step 311, when the target object is detected in a second target image, the second target image is output.

In an embodiment of the present disclosure, when the target object is detected in an obtained second target image, the second target image is output, and the second target image may be output to a corresponding display setting.

For example, in the case that a car is travelling at night, when there is no rearward vehicle detected in all the first target images corresponding to the N photometric areas, it is indicated that the area with the highest brightness contains the rearward vehicle. The second target image to be processed is acquired according to the result of average photometry on the area with the highest brightness. The second target image is obtained by adjusting the brightness value of the second target image to be processed. If the vehicle is successfully detected in the second target image, it is indicated that the imaging of the vehicle is clear, and then the second target image may be output.

In step 312, when the target object is not detected in the second target image, a designated photometric area is selected in the plurality of photometric areas, and the designated photometric area is subjected to average photometry.

In an embodiment of the present disclosure, when the target object is not detected in the second target image, a designated photometric area is selected in the plurality of photometric areas, and the designated photometric area is subjected to average photometry.

Exemplarily, the designated photometric area may be a photometric area in an upper central position of the N photometric areas. As shown in FIG. 2, when the image to be tested is divided into 16 photometric areas, the 16 photometric areas are in an arrangement of a matrix of 4×4, each row having 4 photometric areas in total from left to right, and each column having 4 photometric areas from top to bottom. Then the designated photometric area may be in the middle position between the second photometric area N2 and the third photometric area N3 in the first row of the 16 photometric areas.

In step 313, a third target image is acquired and output according to the result of average photometry on the designated photometric area.

In an embodiment of the present disclosure, the exposure value is determined according to the result of average photometry on the designated photometric area. The aperture value and the shutter speed of the camera are adjusted according to the exposure value. The third target image is acquired and output, and then is output to the corresponding display setting.

For example, in the case that a car is travelling at night, when the target object is not detected in the second target image, since a driver would mainly focus on the situation of the rearward vehicle while driving the car, the photometric area farther from the car and behind the car may be selected as the designated photometric area. That is, the photometric area in the middle upper central position of the N photometric areas is used as the designated photometric area, and the average photometry is performed on the designated photometric area. A third target image is acquired and output according to the result of average photometry on the designated photometric area.

It should be noted that the second target image and the third target image are also complete pictures including the plurality of photometric areas respectively.

In summary, according to an imaging method provided by an embodiment of the present disclosure, the spot photometry is performed on the first photometric area of the plurality of photometric areas divided from the image to be tested. According to the result of spot photometry on the first photometric area, a first target image corresponding to the image to be tested is acquired. By selecting an appropriate first photometric area to perform the spot photometry and then acquiring the first target image according to the result of spot photometry, the imaging of the target object contained in the first target image would be clearer since the photometric result of a spot photometry is more accurate and is not affected by other areas. Brightness adjustment is not performed on any area after the first target image is acquired, so that the contrast of the first target image would not be lowered. When the target object is not detected in the first target image, average photometry is performed on the area with the highest brightness in the plurality of photometric areas, and a second target image to be processed is acquired according to the result of average photometry. By adjusting the brightness value of the second target image to be processed, the position of the target object could be detected more accurately.

Figure 4:
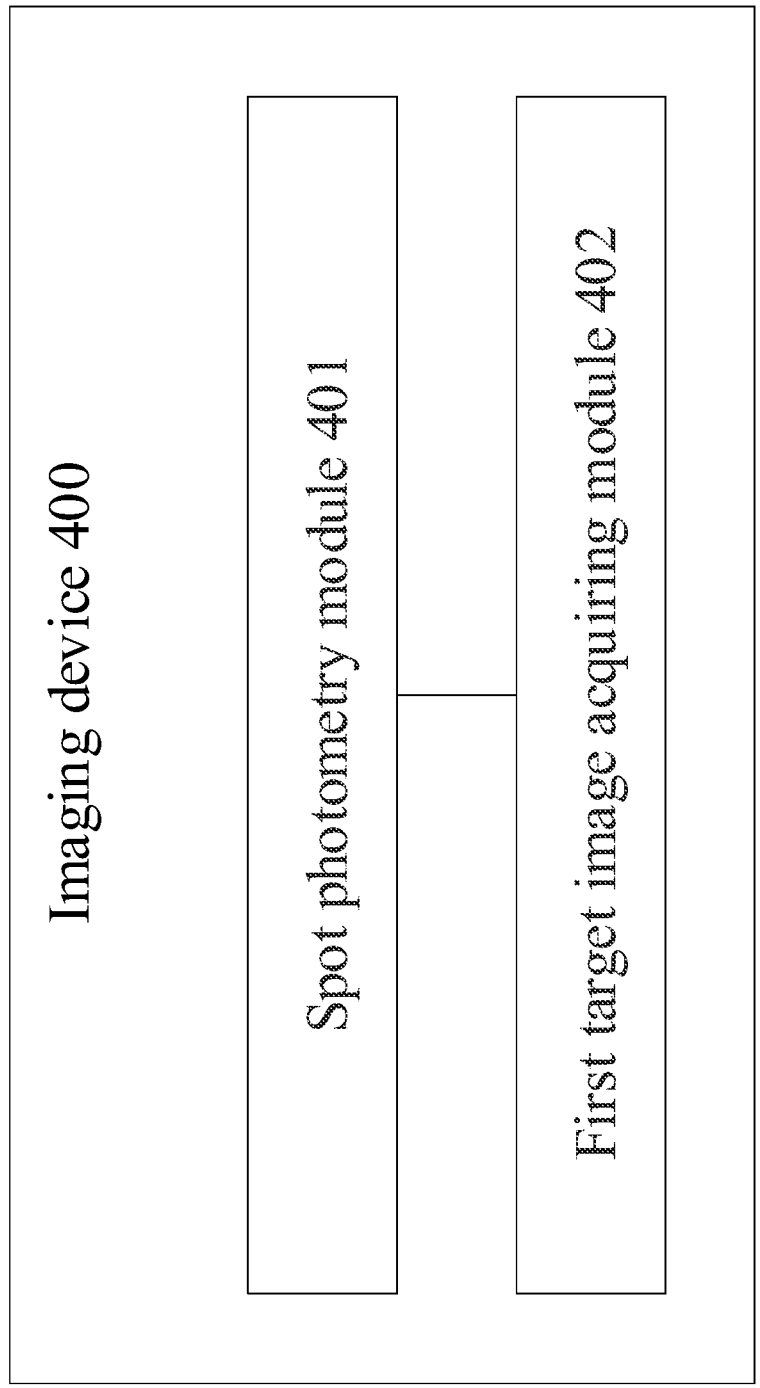
FIG. 4 shows a block diagram of a structure of an imaging device according to an embodiment of the present disclosure.

Referring to FIG. 4, in which a block diagram of a structure of an imaging device according to an embodiment of the present disclosure is shown.

The imaging device 400 in the embodiments of the present disclosure includes:

a spot photometry module 401 configured to perform spot photometry on a first photometric area of a plurality of photometric areas divided from an image to be tested; and a first target image acquiring module 402 configured to acquire, according to a result of spot photometry on the first photometric area, a first target image corresponding to the image to be tested.

Figure 5:
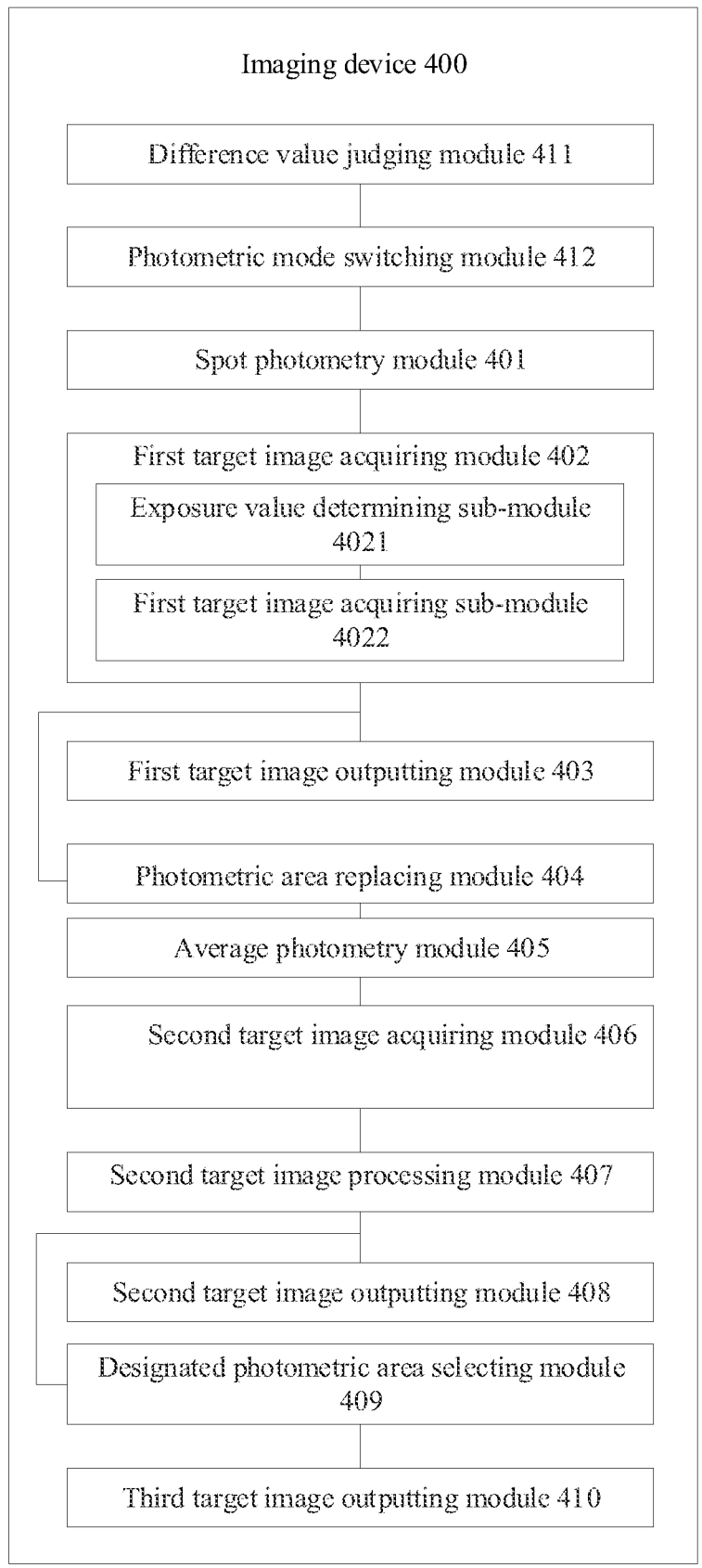
FIG. 5 shows a block diagram of a structure of another imaging device according to an embodiment of the present disclosure.

Referring to FIG. 5, in which a block diagram of a structure of another imaging device according to an embodiment of the present disclosure is shown.

In some embodiments, the first target image acquiring module 402 may include:

an exposure value determining sub-module 4021 configured to determine an exposure value according to the result of spot photometry on the first photometric area; and a first target image acquiring sub-module 4022 configured to acquire, based on the exposure value, the first target image corresponding to the image to be tested.

In some embodiments, the imaging device 400 further includes:

a first target image outputting module 403 configured to output a first target image when a target object is detected in the first target image.

In some embodiments, the imaging device 400 further includes:

a photometric area replacing module 404 configured to, when the target object is not detected in the first target image, replace the first photometric area of the plurality of photometric areas, perform spot photometry on the replaced first photometric area, and acquire, according to the result of spot photometry, the first target image.

In some embodiments, the imaging device 400 further includes:

an average photometry module 405 configured to, when the target object is not detected in the first target images corresponding to the plurality of photometric areas, perform average photometry on the area with the highest brightness in the plurality of photometric areas;

a second target image acquiring module 406 configured to acquire, according to a result of average photometry on the area with the highest brightness, a second target image to be processed;

a second target image processing module 407 configured to adjust the brightness value of the second target image to be processed to obtain the second target image; and a second target image outputting module 408 configured to output the second target image when the target object is detected in the second target image.

In some embodiments, the imaging device 400 further includes:

a designated photometric area selecting module 409 configured to, when the target object is not detected in the second target image, select a designated photometric area in the plurality of photometric areas, and perform average photometry on the designated photometric area; and a third target image outputting module 410 configured to acquire and output a third target image according to a result of average photometry on the designated photometric area.

In some embodiments, the imaging device 400 further includes:

a difference value judging module 411 configured to judge whether the difference value between brightness values of any two imaging areas in the image to be tested is greater than a set threshold; and a photometric mode switching module 412 configured to, when the difference value between brightness values of any two imaging areas is greater than the set threshold, switch the photometric mode to spot photometric mode.

In summary, according to the imaging device provided by the embodiment of the present disclosure, the spot photometry is performed on the first photometric area of the plurality of photometric areas divided from the image to be tested. According to the result of spot photometry on the first photometric area, the first target image corresponding to the image to be tested is acquired. By selecting an appropriate first photometric area to perform the spot photometry and then acquiring the first target image according to the result of spot photometry, the imaging of the target object contained in the first target image would be clearer since the photometric result of a spot photometry is more accurate and is not affected by other areas. Brightness adjustment is not performed on any area after the first target image is acquired, so that the contrast of the first target image would not be lowered. When the target object is not detected in the first target image, average photometry is performed on the area with the highest brightness in the plurality of photometric areas, and a second target image to be processed is acquired according to the result of average photometry. By adjusting the brightness value of the second target image to be processed, the position of the target object could be detected more accurately.

In one embodiment of the present disclosure, there is also provided a rearview mirror. The rearview mirror may be a central rearview mirror. The rearview mirror may comprise the above imaging device 400, wherein the rearview mirror may be applied to a vehicle.

The detailed description of the imaging device 400 may be referred to the corresponding description of the above embodiments, and are not repeated here.

In a vehicle, other vehicles in front can be directly observed by human eyes, while the rearward vehicle usually needs to be observed by means of the rearview mirror. Therefore, the effect will be better if the above imaging device is added to the rearview mirror.

In an embodiment of the present disclosure, the rearview mirror comprises the imaging device. The spot photometry is performed on the first photometric area of the plurality of photometric areas divided from the image to be tested. According to the result of spot photometry on the first photometric area, the first target image corresponding to the image to be tested is acquired. By selecting an appropriate first photometric area to perform the spot photometry and then acquiring the first target image according to the result of spot photometry, the imaging of the target object contained in the first target image would be clearer since the photometric result of a spot photometry is more accurate and is not affected by other areas. Brightness adjustment is not performed on any area after the first target image is acquired, so that the contrast of the first target image would not be lowered.

In an exemplary embodiment, there is also provided a computer program product storing therein instructions that, when executed in a computer, cause the computer to perform the imaging method provided in the embodiments of the present disclosure. For example, the method may include: performing spot photometry on the first photometric area of the plurality of photometric areas divided from the image to be tested; and acquiring a first target image corresponding to the image to be tested according to the result of spot photometry on the first photometric area.

In an exemplary embodiment, there is also provided a chip comprising a programmable logic circuit and/or program instructions. The chip, when operating, can perform the imaging method provided in the embodiments of the present disclosure. For example, the method may include: performing spot photometry on the first photometric area of the plurality of photometric areas divided from the image to be tested; and acquiring a first target image corresponding to the image to be tested according to the result of spot photometry on the first photometric area.

To briefly demonstrate the foregoing individual method embodiments, they are all described as a series of combinations of actions. However, those skilled in the art should understand that the present disclosure is not limited by the order of the actions as described, since according to the present disclosure, some steps can be performed in other orders or simultaneously. Secondly, those skilled in the art should also understand that the embodiments described in the specification are all preferred embodiments, and the actions and modules involved are not necessarily required by the present disclosure.

The respective embodiments in the present specification are described in a progressive manner. Each embodiment focuses on the differences from other embodiments, and the same and similar parts among the respective embodiments can be referred to each other.

Finally, it should also be noted that in the context, the relational terms such as first and second are merely used to distinguish one entity or operation from another entity or operation, and do not necessarily require or imply that these entities or operations have any such actual relationship or order. Furthermore, the terms "comprise", "include", "contain", or any other variants are intended to encompass the nonexclusive inclusion, such that the processes, methods, commodities or devices comprising, including or containing a series of elements not only comprise these elements, but also comprise other elements which are not explicitly listed, or also comprise the inherent elements of such processes, methods, commodities or devices. Without more limitations, the element defined by the phrase "comprising a . . . " does not exclude the existence of other same or similar elements in the process, method, commodity, or device that comprising such element.

The imaging method, the imaging device and the rearview mirror provided in the present disclosure are described in detail above. The principles and implementations of the present disclosure are set forth by using some specific examples in the context. The description of the above embodiments is only for purpose of helping to understand the method and the core concept of the present disclosure. Meanwhile, those ordinary skilled in the art could make changes to the specific embodiments and application scopes according to the core concept of the present disclosure. In conclusion, the content of the specification should not be understood as restrictive of the present disclosure.

What is claimed is:

1. An imaging method, comprising:
performing spot photometry on a first photometric area of a plurality of photometric areas divided from an image to be tested, wherein the first photometric area is any one of the plurality of photometric areas; and
acquiring, according to a result of spot photometry on the first photometric area, a first target image corresponding to the image to be tested, the method further comprising:
when a target object is not detected in the first target image corresponding to the plurality of photometric areas, performing average photometry on an area with the highest brightness in the plurality of photometric areas;
acquiring, according to a result of average photometry on the area with the highest brightness, a second target image to be processed;
adjusting the brightness value of the second target image to be processed to obtain the second target image; and
outputting the second target image when the target object is detected in the second target image.

2. The method according to claim 1, wherein said acquiring, according to a result of spot photometry on the first photometric area, the first target image corresponding to the image to be tested comprises:
   determining an exposure value according to the result of spot photometry on the first photometric area; and
   acquiring, based on the exposure value, the first target image corresponding to the image to be tested.

3. The method according to claim 2, wherein said acquiring, based on the exposure value, the first target image corresponding to the image to be tested comprises:
   determining an aperture value and a shutter speed based on the exposure value; and
   acquiring, based on the aperture value and the shutter speed, a first target image corresponding to the image to be tested.

4. The method according to claim 1, further comprising:
   outputting the first target image when the target object is detected in the first target image.

5. The method according to claim 4, further comprising:
   when the target object is not detected in the first target image, replacing the first photometric area of the plurality of photometric areas, performing spot photometry on the replaced first photometric area, and acquiring, according to the result of spot photometry, the first target image.

6. The method according to claim 1, further comprising:
   when the target object is not detected in the second target image, selecting a designated photometric area from the plurality of photometric areas, and performing average photometry on the designated photometric area; and
   acquiring and outputting a third target image according to a result of average photometry on the designated photometric area.

7. The method according to claim 1, prior to said performing spot photometry on a first photometric area of a plurality of photometric areas divided from an image to be tested, further comprising:
   judging whether the difference value between brightness values of any two imaging areas in the image to be tested is greater than a set threshold; and
   when the difference value between brightness values of any two imaging areas is greater than the set threshold, switching a photometric mode to a spot photometric mode.

8. The method according to claim 1, wherein the result of spot photometry on the first photometric area comprises: the brightness of light reflected by an object being shot in the first photometric area.

9. An imaging device, comprising:
   one or more processors; and
   a memory;
   wherein the memory stores one or more programs configured to be executed by the one or more processors, and the one or more programs comprise instructions for performing the following operations of: performing spot photometry on a first photometric area of a plurality of photometric areas divided from an image to be tested, wherein the first photometric area is any one of the plurality of photometric areas; and
   acquiring, according to a result of spot photometry on the first photometric area, a first target image corresponding to the image to be tested, wherein the one or more programs further comprise instructions for performing the following operations of:
   when a target object is not detected in the first target image corresponding to the plurality of photometric areas, performing average photometry on an area with the highest brightness in the plurality of photometric areas;
   acquiring, according to a result of average photometry on the area with the highest brightness, a second target image to be processed;
   adjusting the brightness value of the second target image to be processed to obtain the second target image; and
   outputting the second target image when the target object is detected in the second target image.

10. The device according to claim 9, wherein the one or more programs comprise instructions for performing the following operations of:
    determining an exposure value according to the result of spot photometry on the first photometric area; and
    acquiring, based on the exposure value, the first target image corresponding to the image to be tested.

11. The device according to claim 10, wherein the one or more programs comprise instructions for performing the following operations of:
    determining an aperture value and a shutter speed based on the exposure value; and
    acquiring, based on the aperture value and the shutter speed, a first target image corresponding to the image to be tested.

12. The device according to claim 9, wherein the one or more programs further comprise instructions for performing the following operations of:
    outputting the first target image when the target object is detected in the first target image.

13. The device according to claim 12, wherein the one or more programs further comprise instructions for performing the following operations of:
    when the target object is not detected in the first target image, replacing the first photometric area of the plurality of photometric areas, performing spot photometry on the replaced first photometric area, and acquiring, according to the result of spot photometry, the first target image.

14. The device according to claim 9, wherein the one or more programs further comprise instructions for performing the following operations of:
    when the target object is not detected in the second target image, selecting a designated photometric area from the plurality of photometric areas, and performing average photometry on the designated photometric area; and
    acquiring and outputting a third target image according to a result of average photometry on the designated photometric area.

15. The device according to claim 9, wherein the one or more programs further comprise instructions for performing the following operations of:
    judging whether the difference value between brightness values of any two imaging areas in the image to be tested is greater than a set threshold; and
    when the difference value between brightness values of any two imaging areas is greater than the set threshold, switching a photometric mode to a spot photometric mode.

16. The device according to claim 9, wherein the result of spot photometry on the first photometric area comprises: the brightness of light reflected by an object being shot in the first photometric area.

17. A rearview mirror comprising an imaging device, wherein the imaging device comprises: one or more processors; and
a memory;
wherein the memory stores one or more programs configured to be executed by the one or more processors, and the one or more programs comprise instructions for performing the following operations of: performing spot photometry on a first photometric area of a plurality of photometric areas divided from an image to be tested, wherein the first photometric area is any one of the plurality of photometric areas; and
acquiring, according to a result of spot photometry on the first photometric area, a first target image corresponding to the image to be tested, wherein the one or more programs further comprise instructions for performing the following operations of:
when a target object is not detected in the first target image corresponding to the plurality of photometric areas, performing average photometry on an area with the highest brightness in the plurality of photometric areas;
acquiring, according to a result of average photometry on the area with the highest brightness, a second target image to be processed;
adjusting the brightness value of the second target image to be processed to obtain the second target image; and
outputting the second target image when the target object is detected in the second target image.

* * * * *